Nov. 23, 1971    G. BIANCHI    3,621,630
PACKAGING MACHINE
Filed Aug. 15, 1969    3 Sheets-Sheet 1

INVENTOR

Bianchi Giuseppe

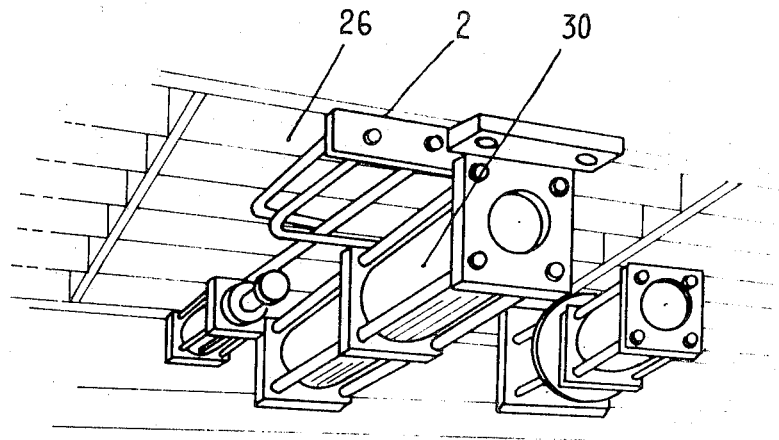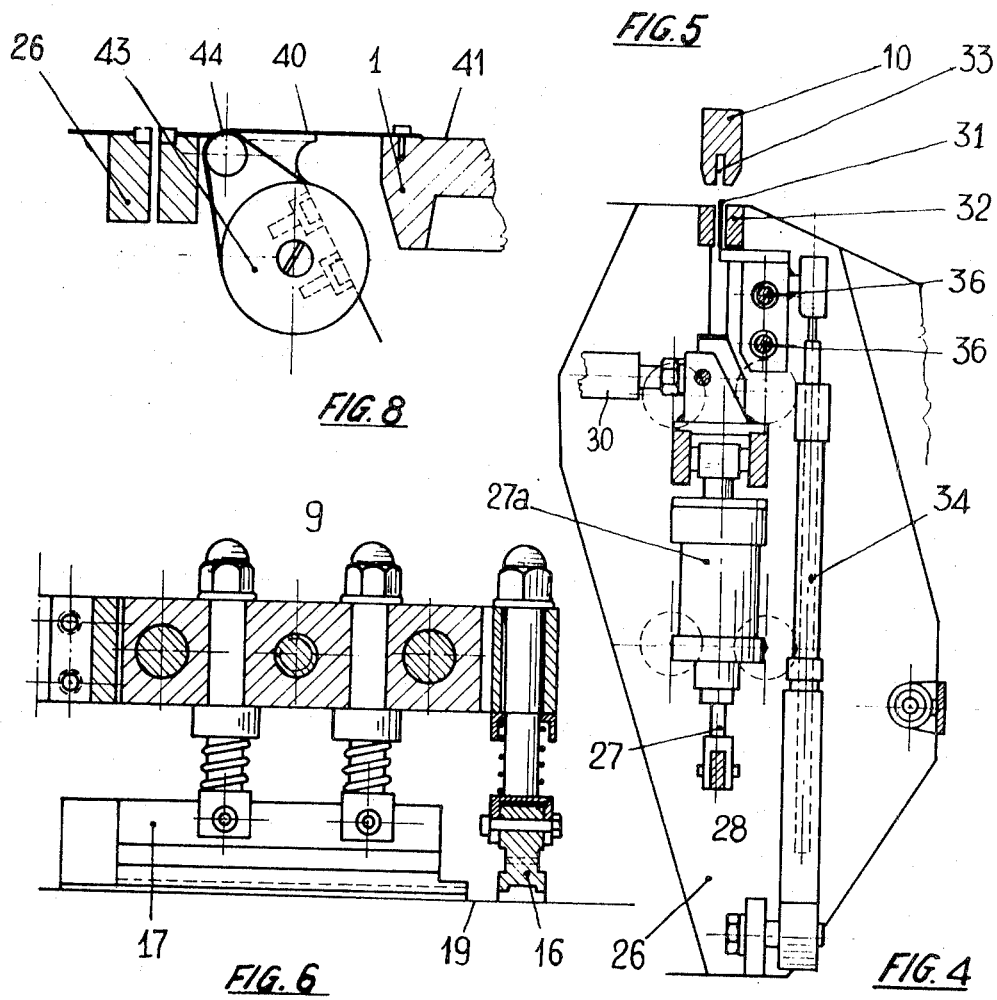

United States Patent Office 3,621,630
Patented Nov. 23, 1971

3,621,630
PACKAGING MACHINE
Giuseppe Bianchi, Busto Arsizio, Italy, assignor to
S.p.A. Virginio Rimoldi & C., Milan, Italy
Filed Aug. 15, 1969, Ser. No. 850,528
Claims priority, application Italy, Sept. 7, 1968,
20,989/68
Int. Cl. B65b 31/04
U.S. Cl. 53—112 A
6 Claims

ABSTRACT OF THE DISCLOSURE

A packaging machine is provided including a loading station of articles to be packaged, a welding station for securing upper and lower films of packaging material about the articles, and means for advancing and cutting of the successive packages formed at the welding station. The advancing and cutting means include a sliding member movable in a feeding direction relative to the fixed structure of the machine and a clamp element in the form of a transversal bar mounted on the sliding member. The clamp element and sliding element have splits for receiving and guiding a cutter in its movement across the feeding direction.

---

Figure 1:
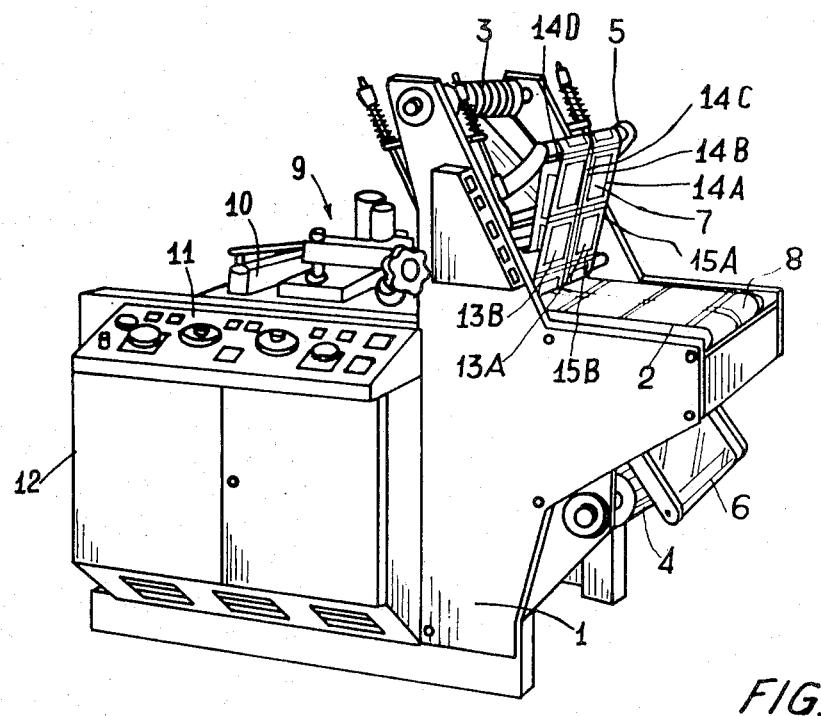

The present invention relates to a packaging machine for different products, closed in sealed and non-sealed envelopes made in filmic material, particularly, but not exclusively, adequate for packing knit articles, shirts and similar, in addition to packing alimentary products.

The packaging machine in question comprises a loading station of the products to be packed, in which the articles are placed over a first continuous film made out of packaging material and below a second continuous film of the same material; a welding station in which these films are superposed and welded according to the contour of the successive packages; a cut station for the separation of every single package which is joined one to the other, on the valley side of the welding station.

It is well known that in the marketing of some particular products, it has been desirable for quite a time to utilize the method of pre-packaging in envelopes obtained by polyethylene films in order to speed upu the packaging of such articles, as well as to assure a long preservation of same and to facilitate their sale.

In the aim of carrying out this type of packaging, several attachments all aiming at making as much as possible automatic and simple the packaging operations have been studied.

It is precisely to the field of these attachments that the machine concerned by the present invention belongs.

The present invention has, at its principal aim, to offer a packaging machine of compact conception, completely automatic, and in a position to assure a high production of packages in time units and owing as well a remarkable versatility of use, having the same the possibility of being easily fitted to the packaging of different types of articles.

This aim and some further ones, which will be explained later, are achieved by a packaging machine as per the invention characterized by the fact that the station for the cut of the single packages includes a sliding member, alternatively movable, in respect of the fixed structure, in the feeding direction of the packages, and supporting a substantially clamp element, in the manner of a transversal bar if compared to the feeding of the sliding member, which raises and falls with regard to the feeding plane of the packages in order to provoke the drawing of some beyond the welding station, in co-ordination with the alternating movements of the sliding member, said sliding member supports in like manner a cut member movable alternatively and in parallel way to said bar, in phase with the raising and falling movements of the bar itself and apted to separate the successive packages.

Figure 7:
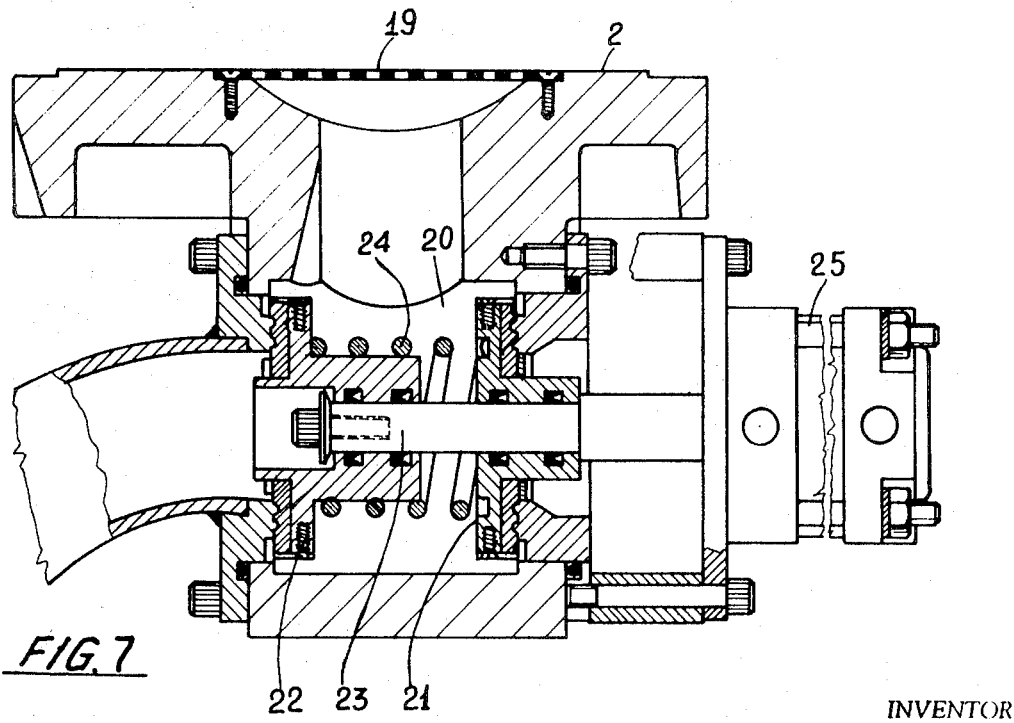
Figure 2:
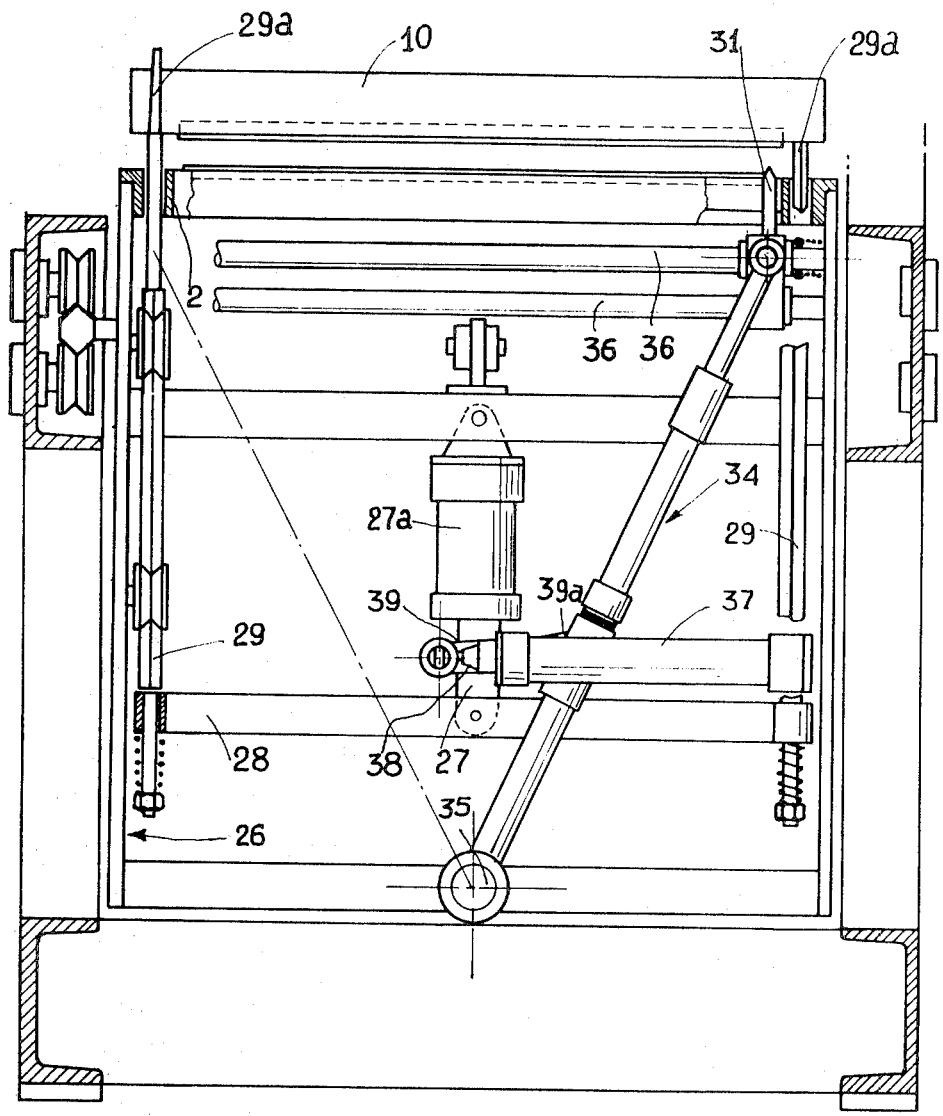
Figure 3:
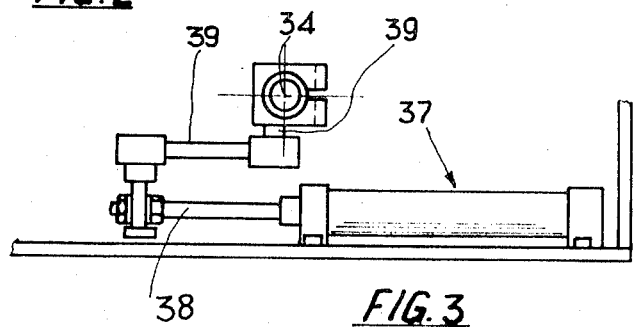

Further characteristics and advantages will appear more clearly and in detail from the specification that will be given in the following pages and in the drawings that are enclosed herewith which show, by way of illustration, a preferred embodiment of the invention, wherein:

FIG. 1, shows the packaging machine in perspective;
FIG. 2 is a frontal view from the side of the exit zone of the packages, and in which view have been illustrated the essential elements;
FIG. 3 is a view in plan of the members causing the transversal movement of the movable cutter;
FIG. 4 is a lateral view of the same members as per FIGS. 2 and 3;
FIG. 5 illustrates in perspective from the bottom upwards the movable sliding member of the machine;
FIG. 6 illustrates the under vacuum chamber which causes the feeding of the packages;
FIG. 7 shows, in section, the valve producing in a cycle the vacuum below the chamber as per FIG. 6;
FIG. 8 shows, in longitudinal section, the winding film attachment which assures the continuity of the feeding plane of the products in spite of the sliding member alternating movement on which the products in question are placed.

With reference to the above mentioned figures, the packaging machine concerned by the present invention is composed of a fixed frame 1 in which can be indentified a work plane 2 and a couple of rolls 3 and 4 for the feeding to the packaging zone of two separate layers of material used for packaging purposes (for instance, a polyethylene film) destined to be joined, in the inside of the machine; thus, shutting up in a bag the product.

By the numbers 5 and 6 are indicated a couple of tensioning and gear rolls around which are unwinding the two films 7 and 8 made out of material for packaging.

By the number 9 is indicated, as a whole, the group for the produuction of the vacuum and of the sealing of the package; whilst by the number 10 is indicated a bar placed transversely to plane 2, longitudinally movable with regard to same and foreseen to act as a drawing clamp, as you will be able to realize later on in this report.

Finally by the number 11 is indicated a panel overlapped to box 12 containing the driving, controlling and signalling attachments.

In the illustrated execution the polyethylene films are foreseen to have a width corresponding to that of two or more packages put one beside the other and, in this aim, are foreseen some thermo-welding attachments operating both on the longitudinal outer edges of the films 7 and 8 and on two median zones.

In other words, each film, 7 and 8, is destinated to constitute one of the layers of the side-joined couples of packages indicated, for instance, as 13a, 13b and, in this aim, the longitudinal thermo-welding lines will be carried out in zones 14a, 14b and 14d·

In addition to this, obviously, some thermo-welding elements, not represented and of a well known type, are executing the transversal welding on the successive packages in zones which are indicated as 15a, 15b and similar. The above mentioned thermo-welding elements are, at any rate, foreseen on the mountain side of the vacuum station 9, after the various weighed quantities of product have been placed in a succession on film 8 which moves forward and before film 7 is superposed to the same.

Right on the valley side of the thermo-welding unit is foreseen an element destined to execute openings on the packages, which are by this time sealed, before the same reach the vacuum station 9. Here is carried out the vacuum in the packages aNd, right after this operation, the opening through which this vacuum has been executed is sealed by means of thermo-welding. In this aim, station 9 includes a welding unit 16 (FIG. 6) hanging from a chamber element 17 submitted to an alternating vertical movement by the action of a fluid-dynamic group.

In correspondence to the zone in which operates the welder 16, the passage plane of the packages is connected, through a grate 19 (FIG. 7), to a chamber 20 inside which are operating two valves, respectively 21 and 22, destined to put into communication said chamber alternatively with a vacuum pump, not indicated, and with the atmosphere.

In this aim, the two valves 21 and 22 are joined one to the other by means of the rod 23 which is axially movable, in opposition to the action of spring 24, by means of a hydraulic jack indicated as number 25 in the sketch.

As already mentioned, in the end zone of plane 2 is located a drawing clamp 10. This clamp is submitted to an alternating vertical movement: in the course of the falling phase such a clamp grips and transfers forward the successive package; then, raises again. To this movement is added that of a longitudinal movement of the clamp 10 all along plane 2.

In order to perform the first movement on the fixed frame of the machine, has to be fitted a sliding member 26 (FIG. 2) to which is combined a hydraulic cylinder 27a with relative piston 27 connected to a transversal bar 28, vertically driven, which is, thus, submitted to an alternating vertical movement.

At the extreme ends of bar 28 are coupled rails 29 that, in their upper portion, are joined in 29a to clamp 10, thus submitting the latter to their own alternating movement. In addition to that, the sliding member 26 is powered with an alternating horizontal translatory motion, which is determined by a cylinder-piston group, indicated as a whole under the reference number 30 (FIG. 5).

Since, as already mentioned, the successive packages are obtained by a couple of continuous films, the separation of the different packages is taking place by means of special knives. In the packaging machine of FIG. 1, a fixed cutter, not visible in the figures, performs the longitudinal cut separating the packages which are side-joined. The separation of the packages which are following each other is, on the other hand, obtained by a movable cutter 31 powered with an alternating movement transversal to the feeding direction of the packages. In more detail, the cutter 31 runs within a split below clamp 10. This clamp is equipped with its own split 33 foreseen to receive the cutter during its movement and when the clamp is found to be in a lowered position.

The alternating movement of the cutter 31 is controlled by a telescopic system 34 hinged at its bottom end 35 to the sliding member and joined at its opposite end to the cutter 31. It has been advantageously foreseen to have the movable attachments, thus built, bound, in their movements, to a couple of guides 36 destined to hinder the occurring of harmful play.

The transversal alternating movements of the cutter 31 (and, consequently, the oscillation of the telescopic system 34) with which the above mentioned cutter is connected, are controlled by means of a horizontal fluid-dynamic group 37 (FIG. 3) in which the piston 38 transfers its own alternating movement, through a connecting rod 39, at an intermediate point 39a of the telescopic group 34.

Since, it is easily understood, the machine can be used with films of weldable material having a variable width, it is necessary to have the possibility of consequently changing the tranversal position of the thermo-welding elements. In this aim, have been foreseen some adjustment means, as, for instance, that of the endless screw type, for the fitting of the machine to the widest range of sizes of the packages. Since the alternating movement of the sliding member 26, on which are moving the products, would hinder the assurance of continuity of the feeding plane of these products (or packages) until the same reach that part of the feeding plane which is fixed, the attachment illustrated under FIG. 8 has been studied and prepared.

The latter is composed, in practice, of a winding film 40 the end of which is fastened on edge to the fixed part 41 of the feeding plane of the products on frame 1.

The film is stretched between such a fixed part 41 and the sliding member 26 and is wound around a revolving drum 43 and joined to the sliding member, after having gone over a gear roll 44.

The return springs included in the drum assure the constant tensioning of the film.

This way, thanks to the back and forth movement of the sliding member, the films gets wound and unwound from the drum 43, thus assuring the continuity of the feeding plane for the packages.

This invention prepared as above described could be varied and modified into several versions, all belonging, however, to the sphere of the invention concept.

Besides, all the details could be replaced by some other element of a technically equivalent value.

What is claimed is:

1. A packaging machine comprising in combination a loading station of the articles to be packed in which the articles are placed over a first continuous film made of packaging material and below a second continuous film of the same material, a welding station in which said films are superposed and welded according to the contour of the articles to form successive packages, means for advancing and cutting off the successive packages, said means comprising a sliding member movable alternatively with respect the fixed structure of said machine in the feeding direction of the packages, a clamp element movable vertically to and from the sliding member and a cutter supported on the sliding member and movable alternatively and laterally to said feeding direction along a straight path, said sliding member and said clamp element having splits formed therein for receiving said cutter in its lateral movement, and means mounted on said sliding member for slidably driving said cutter from edge to edge across said superposed films.

2. The packaging machine of claim 1, wherein both splits receive said cutter when the clamp element is in its lowered position against the sliding member.

3. A packaging machine comprising a loading station of the articles to be packed in which the articles are placed over a first continuous film made of packaging material and below a second continuous film of the same material, a welding station in which these films are superposed and welded according to the contour of the articles to form successive packages, means for advancing and cutting off the successive packages, said means comprising a sliding member movable alternatively with respect to the fixed structure of said machine in the feeding direction of the packages, a clamp element movable vertically to and from the sliding member and a cutter supported on the sliding member and movable alternatively and laterally to said feeding direction along a straight path, said sliding member and said clamp having splits formed therein for receiving said cutter in its lateral movement, and means mounted on said sliding member for slidably driving said cutter from edge to edge across said superposed films, a chamber element, adapted to produce a vacuum in said packages which are advanced to a position adjacent said chamber element, said chamber element having an opening in the passage plane of the packages which communicates with a space inside said chamber element, and valve means mounted in said space and adapted to cyclically connect said space to a vacuum source.

4. A packaging machine comprising a loading station of the articles to be packed, in which the articles are placed over a first film made of packaging material and below a second film of the same material, a welding station in which said films are superposed and welded according to the contour of the articles to form successive packages, a cut station having means for advancing and cutting off said successive packages, said advancing and cutting means including a sliding member movable alternately with respect to the fixed structure of the machine in the feeding direction of the packages, and a winding film arranged between the advancing means and a discharge part of said packaging machine, said winding film being wound around a revolving drum and connected at its opposite ends to said sliding members and the fixed structure of said packaging machine, respectively, and spring elements acting on said drum to maintain the film always stretched.

5. A packaging machine comprising in combination a loading station of the products to be packed in which the products are placed over a first continuous film made of packaging material and below a second continuous film of the same material; a welding station in which said films are superposed and welded according to the contours of the products to provide successive packages; a cutting station for separating the successive packages, said cutting station comprising a sliding member alternately movable relative to the fixed structure of the machine in the feeding direction of the packages and a clamp element in the form of a transversal bar supported on and extending across the feeding direction of the sliding member, said clamp element being mounted for rising and falling movement with respect to the feeding plane of the packages for advancing the packages past said welding station, and a cutting member slidably mounted on said sliding member for movement parallel to said transversal bar, in phase with the rising and falling movements of said transversal bar, for separating the successive packages; and a chamber element adapted to produce a vacuum in the successive packages which are advanced to a position adjacent to said chamber element, said chamber element including a space located below the passage plane of said packages and valve means mounted in said space and adapted to cyclically connect said space to a vacuum source.

6. A packaging machine comprising a loading station of products to be packed in which the products are placed over a first continuous film made out of packaging material and below a second continuous film of the same material; a welding station in which said films are superposed and welded according to the contours of the products to provide successive packages; a cutting station for separating the successive packages, said cutting station comprising a sliding member alternately movable relative to the fixed structure of the machine in the feeding direction of the packages and a clamp element in the form of a transversal bar supported on and extending across the feeding direction of the sliding member, said clamp element being mounted for rising and falling movement with respect to the feeding plane of the packages for advancing the packages past said welding station, and a cutting member mounted on said sliding member for movement parallel to said transversal bar, in phase with the rising and falling movements of said transversal bar, for separating the successive packages; and a film wound around a revolving drum and connected at its opposite ends to said sliding member and the fixed structure of said packaging machine, respectively, to provide a continuous feeding plane for the packages during the alternating movement of said sliding member, said revolving drum including return springs to maintain the film constantly under tension.

References Cited

UNITED STATES PATENTS

| | | | |
|---|---|---|---|
| 3,333,395 | 8/1967 | Doucette et al. | 53—182 |
| 3,389,535 | 6/1968 | Armetti | 53—184 |
| 3,061,984 | 11/1962 | Mahaffy | 53—112 X |

TRAVIS S. McGEHEE, Primary Examiner

E. F. DESMOND, Assistant Examiner

U.S. Cl. X.R.

53—180